Patented June 30, 1942

2,287,901

UNITED STATES PATENT OFFICE 2,287,901

PRODUCTION OF IMPROVED OILS FOR LUBRICATING PURPOSES

Mathias Pier, Heidelberg, and Friedrich Christmann, Ludwigshafen-on-the-Rhine, Germany, assignors, by mesne assignments, to Standard Catalytic Company, a corporation of Delaware No Drawing. Application April 17, 1933, Serial No. 666,542. In Germany April 20, 1932

7 Claims. (Cl. 252—52)

The present invention relates to the production of improved oils for lubricating purposes and, especially, of low pour point oils.

We have found that the setting point of oils is lowered by the addition of even small amounts of products which are obtainable by the condensation of these oxygen derivatives of aliphatic hydrocarbons of high molecular weight above 170, preferably those derivatives of hydrocarbons having a molecular weight of more than 200, in which the oxygen is connected by two linkages with a carbon atom which in turn is in direct combination with only one further carbon atom. The said oxygen derivatives are condensed either alone or together with other organic compounds, advantageously cyclic hydrocarbons or olefines or mixtures of these substances.

As initial materials may be mentioned carboxylic acids having a molecular weight above 200, in particular fatty acids, such as stearic acid, oleic acid, palmitic acid and montanic acid, or the corresponding anhydrides, aldehydes or esters, such as the glycerine esters, or keto acids. Oxidation products, containing carboxyl groups, of paraffin waxes are also suitable.

Of special advantage are the acid chlorides which are prepared in the usual manner by treatment of the acids or their salts with agents capable of replacing organic hydroxy groups by chlorine, for example, thionyl chloride, phosgene, sulphuryl chloride, phosphorus oxychloride, phosphorus trichloride or phosphorus pentachloride. The acid chlorides are then condensed in the presence of condensing agents such as aluminium chloride, zinc chloride, iron chloride, boron fluoride, phosphorus oxychloride, active aluminium, sodium or zinc dust.

The condensation is preferably carried on to such an extent that the final condensation products have a molecular weight of more than 1000. The condensation is advantageously carried out in the presence of substances having a condensing action and presenting a large inner surface, such as bleaching earths or active silica, either alone or in admixture with other condensing agents; the temperatures employed for the condensation preferably range between 30° and 120° C. The condensation products may also be subjected to a subsequent treatment with these substances. In some cases, as for example, when using agents having a strong condensing action, it is preferable to carry out the reaction with the simultaneous addition of compounds retarding the reacton, such as zinc oxide, soda, calcium carbonate or ammonia.

The initial materials may also be treated with agents capable of withdrawing water, such as phosphorus pentoxide, zinc chloride, concentrated sulphuric acid or the like, whereby condensation takes place with the splitting off of water.

The condensation may take place with other substances, in particular with solid or liquid hydrocarbon products, such as tars, mineral oils, their distillation, extraction and cracking products or destructive hydrogenation products of carbonaceous materials. It is of especial advantage to employ as additional substances those comprising hydrocarbons of unsaturated character; liquid olefines which have been obtained from paraffinic hydrocarbons, for example by cracking, may also be employed. The condensation is advantageously effected together with cyclic hydrocarbons. As such may be mentioned in particular naphthalene or mineral coal tar fractions, such as crude benzene, middle oil or anthracene oil, as well as other products of an aromatic nature such as are obtained for example by destructive hydrogenation, preferably at temperatures of the upper part of the temperature range suitable for this reaction which treatment is called "aromatization," or by dehydrogenation. Olefines, such as ethylene, propylene or butylene, in the form of cracking gases may also be brought into reaction during the condensation.

The condensation products obtained according to the present invention have the appearance and the consistency of waxes.

The amounts of the resulting products to be added for the purpose of reducing the setting point may vary within wide limits, as for example between 0.1 and 10 per cent. Even lubricating oils, gear oils or gear grease having very high setting points are considerably improved by the addition.

The condensation products prepared according to the present invention may be added to the lubricating oils also in larger amounts, as for example in amounts of 20 or 30 or 40 per cent or even more, whereby the viscosity index of the said oils is considerably improved.

The following examples will further illustrate the nature of this invention but the invention is not restricted to these examples. The parts are by weight.

*Example 1*

Stearic acid is converted, by treatment with thionyl chloride at 80° C. into stearic acid chloride. 100 parts of the latter are dissolved in 100 parts of illuminating petroleum and, after the addition of 20 parts of naphthalene and 7 parts of aluminium chloride, are kept at about 30° C. for 24 hours, and then for from about 1 to 2 hours at 90° C. The resulting condensation product is freed from aluminium chloride by centrifuging and distilled in vacuo. 85 parts of a waxy product are obtained as the distillation residue. If this be added in an amount of 0.5 per cent to a German machine oil having a setting point of ±0° C., the setting point is lowered by about 25° C.

*Example 2*

95 parts of a gear oil are mixed with 5 parts of a synthetic oil prepared as described in Example 1. In this manner a gear oil is produced which remains soft or liquid even at low temperatures, whereby the lubricating capacity of the gear oil as well as its capacity of facilitating the control of the driving gear is increased.

*Example 3*

Oleic acid is converted into oleic acid chloride by treatment with thionyl chloride at 80° C. 100 parts of this oleic acid chloride are then dissolved in 100 parts of illuminating oil and then subjected to the action of aluminium chloride at first for about 24 hours at about 30° C. and subsequently for about from 1 to 2 hours at 90° C. The resulting product is separated by centrifuging from aluminium chloride and then subjected to distillation in vacuo. As the distillation residue 85 parts of a waxy product are obtained which when added to a German mineral oil having a setting point of 0° C. in an amount of 0.5 per cent lowers the setting point by 20° C. Before the condensation 20 parts of oleic acid ethyl ester may be added to the oleic acid chloride.

What we claim is:

1. An improved lubricating oil comprising a viscous hydrocarbon containing a waxy distillation residue of a product prepared by the condensation of an acid chloride of a carboxylic acid having a molecular weight of more than 200.

2. The composition as defined in claim 1, wherein said waxy distillation residue has a molecular weight of more than 1000.

3. The composition as defined in claim 1, wherein said waxy distillation residue is of a product prepared by condensing an acid chloride of a carboxylic acid selected from the group consisting of stearic acid, oleic acid, palmitic acid and montanic acid.

4. An improved lubricating oil comprising a viscous hydrocarbon containing a waxy distillation residue of a product prepared by the condensation of an acid chloride of a fatty acid having a molecular weight of more than 200 with a from solid to liquid hydrocarbon product.

5. The composition as defined in claim 4, wherein said waxy distillation residue has a molecular weight of more than 1000 and wherein said hydrocarbon product is selected from the class consisting of liquid olefines and aromatic hydrocarbons.

6. The composition defined in claim 4, wherein said hydrocarbon product is a mineral coal tar fraction.

7. The composition as defined in claim 4 in which the waxy distillation residue is from a condensation product of 2 mols of said fatty acid chloride and about 1 mol of said hydrocarbon product.

MATHIAS PIER.
FRIEDRICH CHRISTMANN.